US007638744B2

(12) United States Patent
Huang et al.

(10) Patent No.: US 7,638,744 B2
(45) Date of Patent: Dec. 29, 2009

(54) SYSTEM AND METHOD FOR STABILIZING WAVELENGTH OF LED RADIATION IN BACKLIGHT MODULE

(75) Inventors: Zhi-Xian Huang, Taichung County (TW); Hong-Xi Cao, Kaohsiung County (TW); Kun-Chieh Chang, Tainan (TW); Fu-Shun Ho, Kaohsiung (TW); Chun-Chieh Yang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/965,577

(22) Filed: Dec. 27, 2007

(65) Prior Publication Data

US 2009/0166508 A1 Jul. 2, 2009

(51) Int. Cl.

| | |
|---|---|
| ***G01J 1/32*** | (2006.01) |
| ***G01J 1/44*** | (2006.01) |
| ***G05F 1/00*** | (2006.01) |
| ***F21V 9/00*** | (2006.01) |

(52) U.S. Cl. .................. 250/205; 250/214 C; 315/307; 362/231

(58) Field of Classification Search ................. 250/205, 250/552, 553, 214 R, 214.1, 208.1, 201.1–201.4, 250/214 C, 214 LA, 214 AL, 214 LS; 362/184, 362/185, 800, 231, 236, 239–240; 315/291, 315/307; 257/80–84, 88–89; 356/420, 425
See application file for complete search history.

(56) References Cited

U.S. PATENT DOCUMENTS

| | | | | |
|---|---|---|---|---|
| 6,507,159 | B2 * | 1/2003 | Muthu | 315/307 |
| 6,678,293 | B2 | 1/2004 | Colace et al. | |
| 7,133,136 | B2 | 11/2006 | Soskind | |
| 7,220,959 | B2 | 5/2007 | Nishimura | |

* cited by examiner

*Primary Examiner*—Georgia Y Epps
*Assistant Examiner*—Don Williams
(74) *Attorney, Agent, or Firm*—J.C. Patents

(57) ABSTRACT

The system for stabilizing wavelength of LED (light emitting diode) radiation in backlight module of the LCD (liquid crystal display) comprises two photodiodes, a plurality of LEDs, a microprocessor unit (MCU) and a driver circuit, wherein two photodiodes have different photo sensitivities in response different wavelengths. A target value, associated with a ration of photo sensitivities of the two photodiodes under two different wavelength radiations, is stored to the MCU as a referred value. Thus, another wavelength (or wavelength variation) of LED radiation is derived by comparing another target value with the referred value. The MCU determines a correction constant based on a color match function of the derived wavelength, and outputs a compensation signal to compensate LED, wherein the compensation signal is equal to multiplication of the correction constant and an original light intensity compensation signal for compensating light intensity loss of the LED.

23 Claims, 7 Drawing Sheets

SYSTEM AND METHOD FOR STABILIZING WAVELENGTH OF LED RADIATION IN BACKLIGHT MODULE

BACKGROUND OF THE INVENTION

1. Field of the Invention

The present invention generally relates to a method for wavelength stabilization of a liquid crystal display (LCD). More particularly, the present invention relates to a system and method for stabilizing wavelength of LED (light emitting diode) radiation in backlight module of the LCD.

2. Description of Related Art

An LCD includes a controllable transmissive display panel that faces users, and a backlight module that provides the controllable transmissive display panel with illumination from its rear side. The backlight module may employ LED or cold cathode fluorescent lamp (CCFL) as a light source. The LED backlight module has at least two advantages over CCFL backlight module; one is full color reproduction and the other is no contamination of mercury (Hg). During the period of manufacturing the CCFL backlight module, operators may be endangered if mercury contained in the CCFL is released. As such, the LED backlight module not only provides users with better color quality but also prevents the operators from being poisoned by mercury. Hence, the LED backlight module is promising to be a main stream of next generation of displays.

In the LED backlight module, a plurality of LEDs are arranged in a matrix form that illumines pixels of the controllable transmissive display panel. Since any color light is a combination of three prime colors; i.e. red (R), green (G) and blue (B) colors, every red LED, green LED and blue LED are grouped in order to illumine each pixel. For example, with a certain combination of R, G and B colors, there produces "white" light. However, the LED backlight module has some drawbacks. That is, aging of the LED backlight module and variation of environment temperature respectively incur light intensity attenuation and wavelength drift, degree of which are varied for the different LEDs with the same color. As shown in FIG. 1, as environment temperature changes from 34° C. to 78° C., wavelength of LED radiation shifts from shorter wavelength to longer wavelength. Thus, a circuit, capable of detecting light intensity and wavelength of each LED radiation and then proceeding to compensate them if they deviate from default values, is a crucial component for improving performance of the LED backlight module. However, currently, all color feedback systems for the LED backlight module compensate each produced color or light intensity of each LED radiation, rather than wavelength of each LED radiation. Since human eyes have different sensitivities for different wavelengths, even the same color light with different wavelengths causes human eyes to have different stimulus. Furthermore, conventional color sensors are only responsive to light intensity, rather than to offset of wavelength of each LED radiation. In other words, the conventional color sensors are not able to compensate variation of wavelength of each LED radiation even color feedback systems are employed, which causes the chromaticity coordinate of the LED backlight module to be drifted.

Additionally, as there exists parameter discrepancy in growth of epitaxy layer when manufacturing the LED, there are wavelength discrepancies among a batch LEDs with the same color. To avoid higher cost for batching LEDs with a wavelength range (hereinafter referred to as bin), nowadays the bin employs 5 nm as a minima bin range. However, the 5 nm bin incurs color shift perceived by human eyes. Thus, to overcome this color shift, a smaller bin is necessitated, which in turn increases the cost for batching LEDs. Moreover, as mentioned above, stability of the chromaticity coordinate of the LED backlight module is affected by the environment temperature.

There are some approaches to overcome aforementioned problems. For example, U.S. Pat. No. 7,220,959 discloses a differential color sensor 200 without filters. As shown in FIG. 2, two photodiodes 100, 150 are fabricated such that they have different sensitivities vs. wavelengths, wherein one has its sensitivity peak in shorter wavelengths, while the other has its sensitivity peak in longer wavelengths. The two photodiodes convert received light into voltage signals via resistors 120, 170, and a voltage ratio between these two photodiodes is obtained via a divider 210. Based on the voltage ration, spectra content of incident light can be obtained. However, U.S. Pat. No. 7,220,959 is not able to calculate wavelength variation of radiation of these two photodiodes, and independently compensate wavelength variation for each one of these two photodiodes.

U.S. Pat. No. 6,678,293 discloses a wavelength sensitive device for wavelength stabilization. This wavelength sensitive device (i.e. photodiode) comprises a plurality of layers jointly defining two opposite diodes generating opposite photocurrents. Amount of the opposite photocurrents is determined in accordance with fabricating parameters of the two opposite diodes. That is, by using a certain doping ratio for the two opposite diodes, an output current of the photodiode is zero under the conditions of specific wavelength and a fixed bias voltage. If there is wavelength variation in incident light, the output current is not zero because the two photocurrents generated by these two respective diodes cannot be offset each other. Thus, the wavelength shift can be detected by implementing the output current. However, U.S. Pat. No. 6,678,293 needs specific fabricating parameters, which in turn significantly increases manufacturing cost. Thus, this approach cannot be applied to the LED backlight module. Another prior art is U.S. Pat. No. 7,133,136 that discloses a method for stabilizing wavelength and intensity of laser radiation. This method is achieved by implementing two photodiodes; one is responsible for measuring light intensity and the other is responsible for measuring wavelength. U.S. Pat. No. 7,133,136 has a drawback in that since directivity of LED radiation is not so high as the laser, wavelength variation of LED radiation cannot be sensed by implementing operations at different incident angles of photodiode radiation. All aforementioned prior arts intend to detect the wavelength shift of the laser radiation. Even these prior art are applied to the LED backlight module, they only are capable of identifying color. However, in the LED backlight module, the wavelength variation of the LED radiation is only 1-2 nm, which cannot cause color shift in chromaticity coordinate so that these prior arts cannot be applied to detect this color shift. Moreover, these prior arts cannot be applied to detect every wavelength variation of individual LED in the LED backlight module, and then compensate the wavelength variation for each LED. Accordingly, there exists a need for stabilizing wavelength (or referred to as "stabilizing chromaticity coordinate") of LED radiation for each LED in backlight module, by using different compensation coefficients for different wavelengths.

SUMMARY OF THE INVENTION

Accordingly, the present invention is directed to a system for detecting wavelength of LED (light emitting diode) radiation and stabilizes the chromaticity coordinate in backlight module of an LCD (liquid crystal display), which comprises two photodiodes, a plurality of LEDs, a microprocessor unit (MCU) and a driver circuit, wherein the two photodiodes have different photo sensitivities in response to different wavelengths. A target value is associated with a ration of photo sensitivities of the two photodiodes under two different wavelength radiations, and then stored to the MCU as a referred value. Thus, another wavelength (or wavelength variation) of LED radiation is derived by comparing another target value with the referred value. The MCU determines a correction constant based on a color match function of the derived wavelength, and outputs a compensation signal to compensate the LED, wherein the compensation signal is equal to multiplication of the correction constant and an original light intensity compensation signal for compensating light intensity loss of the LED.

The present invention is directed to a method for stabilizing wavelength of LED radiation in backlight module of the LCD. The method comprises the following steps: (a) storing target value of each wavelength to the MCU; (b) determining a judge range of each wavelength according to statistic analyses; (c) detecting light intensity and wavelength of an LED in a plurality of LEDs; (d) judging if light intensity is varied; if answer is no, the step returns to step (c) to detect next LED; (e) if answer is yes, determining a first compensate value according to variation of light intensity; (f) judging if the detected wavelength is within its judge range, and if answer is yes, the LED is compensated with the first compensate value; (g) if answer is no, determining a correction constant according to the detected wavelength and its corresponding color match function, and compensating the LED with a second compensate value that is equal to multiplication of the correction constant and first compensate value; (h) judging if all LEDs are completely detected, and if answer is no, repeating the steps (c)-(g) and if answer is yes, stabilizing wavelength of LED radiation for all LEDs in the LED backlight module is finished.

The objectives, other features and advantages of the invention will become more apparent and easily understood from the following detailed description of the invention when taken in conjunction with the accompanying drawings.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention.

DESCRIPTION OF THE EMBODIMENTS

Figure 1:
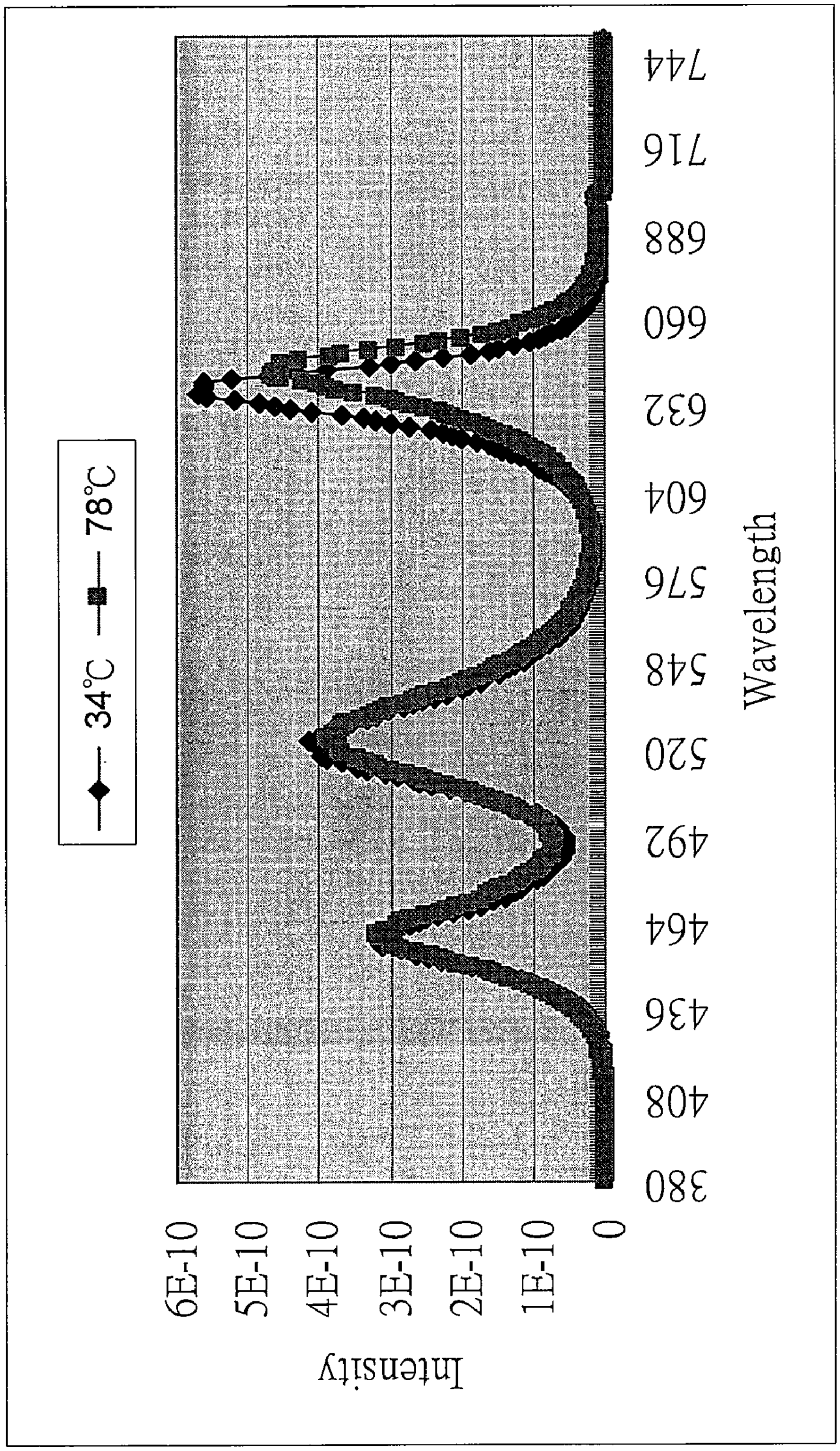
FIG.1 (PRIOR ART)
FIG. 1 is a graph showing a relationship between wavelength variation and environment temperature changes.
Figure 2:
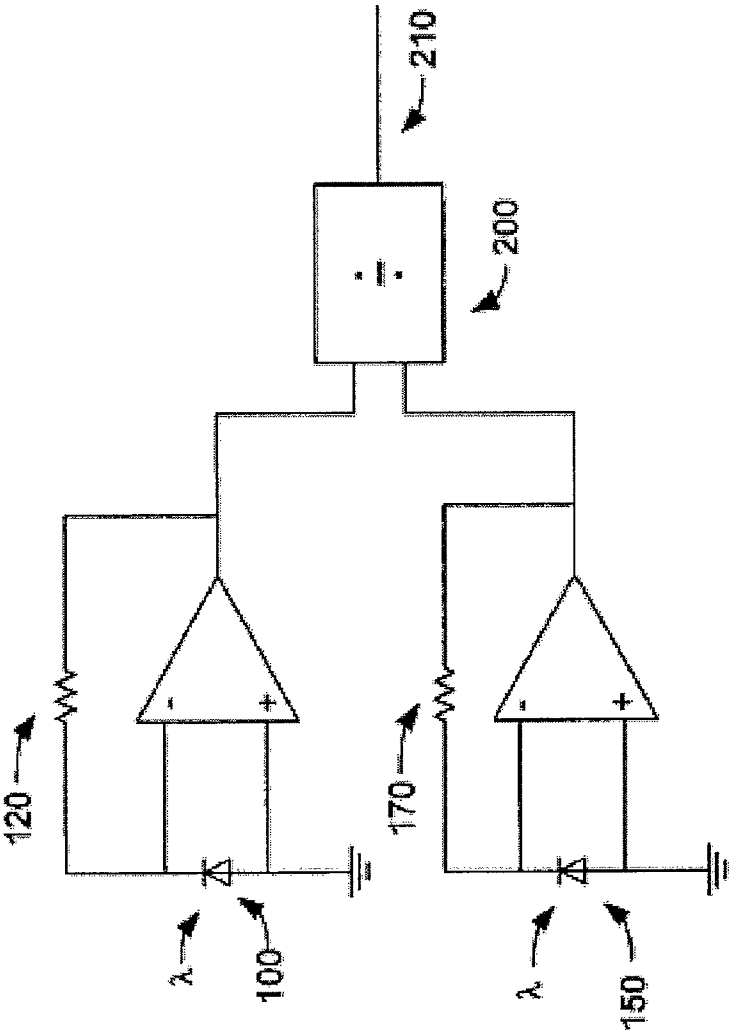
FIG.2 (PRIOR ART)
FIG. 2 is shows a conventional differential color sensor.

Reference will now be made in detail to an inverter circuit of a present preferred embodiment of the invention, examples of which are illustrated in the accompanying drawings. For purpose of clarifying description, throughout the disclosure, the term of "photodiode" is also used to represent a "photo sensor" because it is well known that a "photo sensor" can be a phototransistor, a color sensor or a photo sensitive resistor, which is easily used to replace "photodiode" by the artisan.

Prior to illustrating the preferred embodiment, a chromaticity coordinate is first introduced. The chromaticity coordinate represents all color perceived by human eyes, and obtained by multiplication of light intensity and color match function for each wavelength. To describe color, every color is defined by chromaticity coordinate, wherein abscissa is x and vertical coordinate is y. Each wavelength is expressed by their respective match function. For example, table 1 shows color match functions of red light wavelength from 600 nm to 630 nm.

TABLE 1

| Wavelength (nm) | x | y | z |
|---|---|---|---|
| 600 | 1.062200000000 | 0.631000000000 | 0.000800000000 |
| 605 | 1.045600000000 | 0.566800000000 | 0.000600000000 |
| 610 | 1.002600000000 | 0.503000000000 | 0.000340000000 |
| 615 | 0.938400000000 | 0.441200000000 | 0.000240000000 |
| 620 | 0.854499000000 | 0.381000000000 | 0.000190000000 |
| 625 | 0.751400000000 | 0.321000000000 | 0.000100000000 |
| 630 | 0.642400000000 | 0.265000000000 | 0.000049999990 |

It can be seen from table 1 that if there is 5 nm wavelength variation, for example, from 625 nm to 630 nm, x value of color match function corresponding to wavelength 625 nm is reduced 14.5% from 0.7514 to 0.6424. Accordingly, to compensate such 5 nm wavelength variation of wavelength 625 nm, a correction constant, i.e. 0.7514/0.6424, is used to multiply x value of color match function of wavelength 630 nm in order to restore x value of color match function of wavelength 625 nm.

Figure 3:
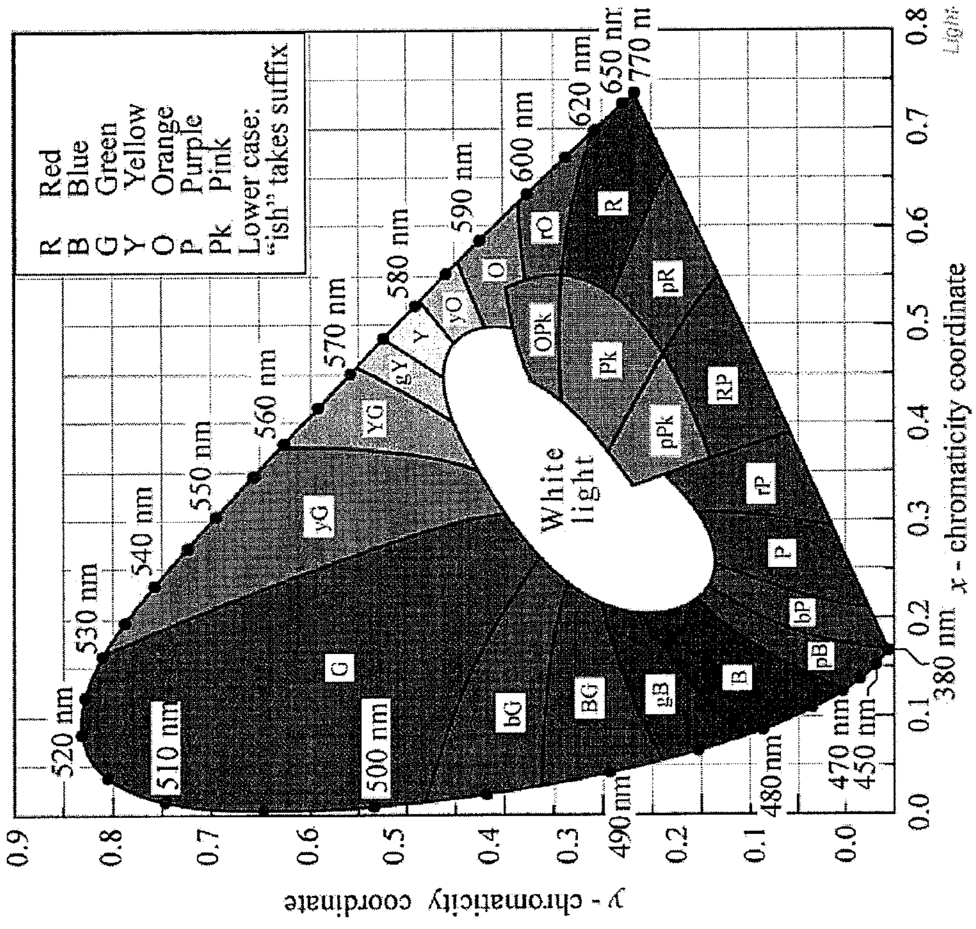
FIG.3 (PRIOR ART)
FIG. 3 is a color chromaticity coordinate.

As shown in FIG. 3, in chromaticity coordinate, different color regions are bounded by their different x and y ranges, For example, white color, a certain range of combinations of red, green and blue light, has x value ranging from about 0.2-0.5 and y value ranging from about 0.15 to 0.45. Accordingly, to stabilize chromaticity coordinate, for example, white light, wavelengths for red, green and blue color should be kept unchanged. Otherwise, there would cause a white light error that in turn is perceived by human eyes. To prevent such chromaticity coordinate shift, wavelength variation of LED radiation needs first to be detected for each wavelength, particular in three prime colors.

The First Preferred Embodiment

Figure 4:
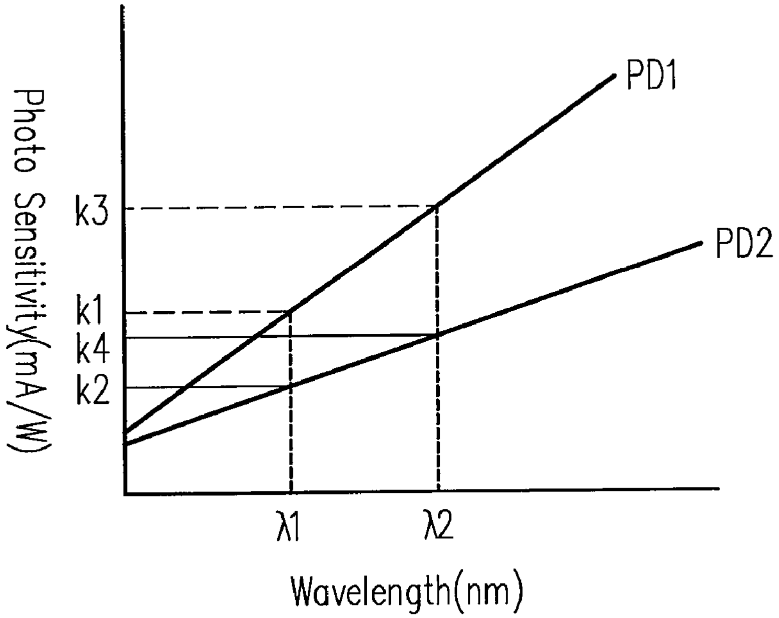
FIG. 4 (PRIOR ART)
FIG. 4 is a graph showing a relationship between wavelengths and photo sensitivity of different photodiodes.
Figure 5:
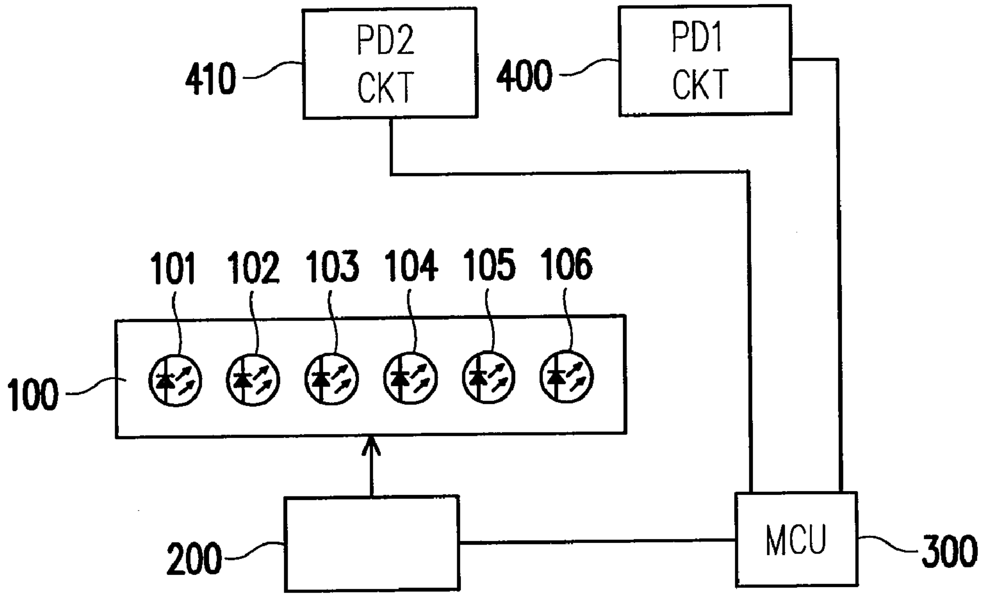
FIG. 5 is a system for stabilizing wavelength of LED radiation in backlight module of an LCD.

Concurrently referring FIGS. 4 and 5, FIG. 5 shows a system for stabilizing wavelength of LED radiation in an LED backlight module of the LCD and FIG. 4 shows photo sensitivity k is linearly proportional to wavelength λ. From FIG. 4, it can be seen that a first photodiode PD1 has photo sensitivities k1 and k3 at wavelengths λ1 and λ2, respectively. Likewise, a second photodiode PD2 has photo sensitivities k2 and k4 at wavelengths λ1 and λ2, respectively. From FIG. 5, a system for stabilizing wavelength of LED radiation in the LED backlight module of the LCD comprises a PD1circuit 400 including a first photodiode PD1, a PD2 circuit 410 including a second photodiode PD2, a plurality of LEDs 101-106 disposed in a light-emitting module 100, a microprocessor unit (MCU) with its input coupled to the PD1 circuit 400 and the PD2 circuit 410, and a driver circuit 200 coupled to the MCU. Moreover, the plurality of LEDs 101-106 are coupled to the driver circuit 200, and arranged in a group manner including a red LED, a green LED and a blue LED. The driver circuit 200 has a current control mode and a voltage control mode, which control on or off of each of the LEDs 101-106. Before calibrating each of the LEDs 101-106 radiation, a target value of each wavelength is pre-stored to the MCU. The target value of each wavelength is calculated as follows. We assume the first and second photodiodes PD1, PD2 are radiated by LED1, which is selected among the LEDs 101-106, wherein LED1 has wavelengths λ1 and light intensity lm1, and LED2, which has the same color and position as LED1, has wavelength λ2 and light intensity lm2. Thus, the sensed photocurrents generated by PD1, PD2 are proportional to radiated area of two photodiodes A1, A2 and light intensity lm1 and lm2. Table 2 shows a relationship between photocurrents and the LED radiation. LED1 and LED2 can be the same one which is before and after the degrading, or different LEDs but have the same color and position in backlight system.

TABLE 2

| | LED1 | LED2 |
|---|---|---|
| PD1 | lm1 × A1 × k1 | Lm2 × A1 × k3 |
| PD2 | lm1 × A2 × k2 | Lm2 × A2 × k4 |

The target value is defined as a ratio of photocurrent of PD1 to that of PD2, which is independent of radiated areas of the two photodiodes and light intensities of an LED1 and an LED2. First, to eliminate a light intensity factor, the photocurrent of PD1 is divided by that of PD2 to obtain (A1×k1)/(A2×k2), a ratio of the photocurrent of PD1 to that of PD2 at the LED1 radiation. Likewise, another ratio of photocurrent of PD1 to that of PD2 at the LED2 radiation is (A1×k3)/(A2×k4). Then, to eliminate a factor of radiated area of two photodiodes, aforementioned ratios of photocurrent of PD1 to that of PD2 at the LED1 radiation and at the LED2 radiation are divided each other in order to obtain the target value (k1/k2)/(k3/k4) for wavelength λ1. Another approach for obtaining the target value is described as follows: using the ratio of the photocurrent of PD1 to that of PD2 obtained at the LED1 radiation as a reference value and setting wavelength of the LED2 radiation unknown; obtaining a target value for the LED2 radiation by dividing the obtained ratio of the photocurrent of PD1 to that of PD2 at the LED2 radiation with the reference value.

Figure 6:
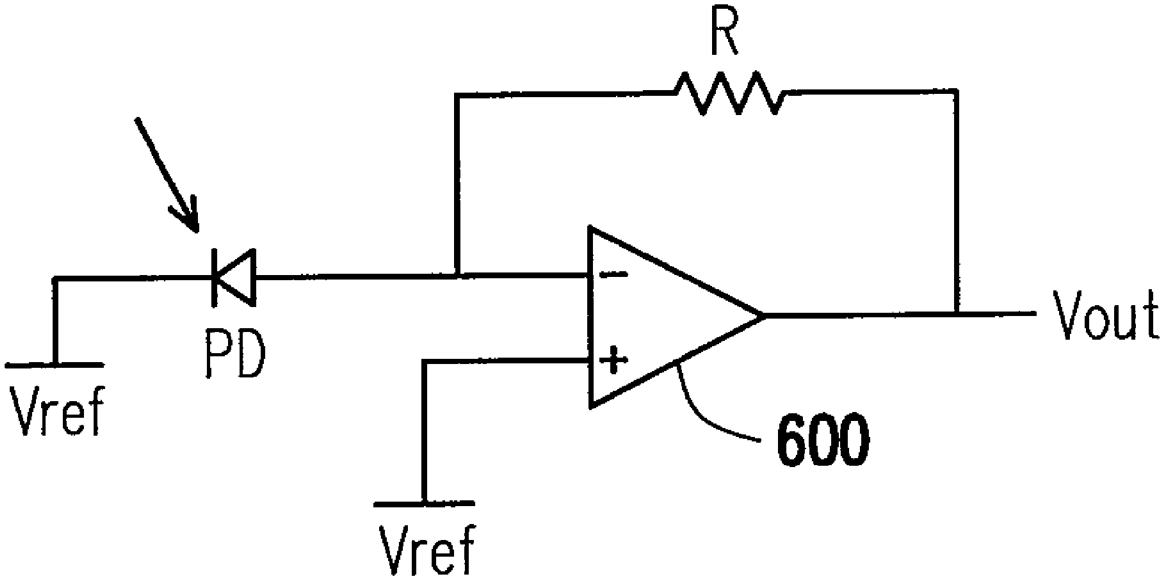
FIG. 6 is a detail circuit of PD1CKT 401 and PD2 CKT 410 shown in FIG. 5.

Alternatively, the target value can be defined as a ratio of photo-voltage of PD1 to that of PD2. As shown in FIG. 6, FIG. 6 is a detail circuit of PD1CKT 401 and PD2 CKT 410 shown in FIG. 5. In FIG. 6, an anode and a cathode of a photodiode PD are coupled to an inverting terminal and a non-inverting terminal of a feedback operation amplifier 600 having a feedback resistor R, respectively. Thus, Vout=Vref−I (photocurrent)×R, wherein photo-voltages of PD1 and PD2 are defined as I×R. Thus, the target value is only a function of photosensitivity of photodiode. After a number of experiments, a judge range for each wavelength is determined by statistical analyses, and can be used to determine a wavelength of a to-be-detected LED radiation. For example, when calculating the target value under the radiation at two wavelengths 460 nm and 465 nm and employing the wavelengths 460 nm radiation as a reference, the target value of wavelength 465 nm is 0.976243 and its judge range is 0.001671. Target values and judge ranges for each wavelength are pre-stored to the MCU. If the target value of the to-be-detected LED deviates from 0.976243 and this deviation falls within the judge range, i.e. 0.001671, the MCU determines that the wavelength of the to-be-detected LED is 465 nm. Then, the MCU calculates a first compensation value (usually in a pulse-width-modulation form) for compensating light intensity variation, and then calculates a second compensation signal that is equal to multiplication of aforementioned correction constant associated with color match function of the wavelength 465 nm, and the first compensation signal. The second compensation signal can be a current PWM (pulse width modulation) form or a voltage PWM. The MCU 300 is coupled to the driver circuit 200, which in turn drives to-be-detected LED (i.e. one of the LEDs 101-106) disposed in the light-emitting module 100 with the second compensation signal.

Figure 7:
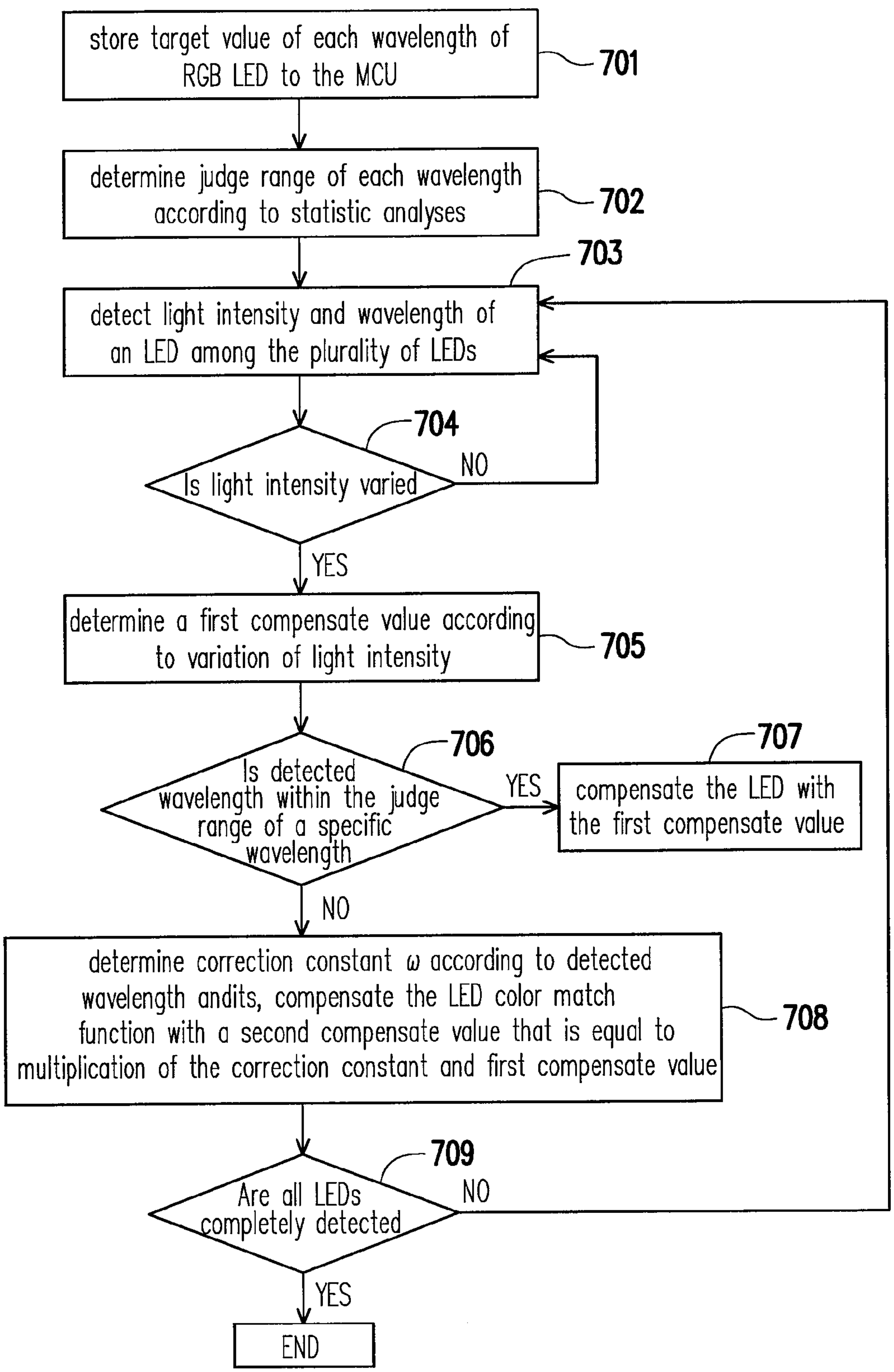
FIG. 7 is a flowchart showing a method for stabilizing wavelength of LED radiation in backlight module of an LCD.

FIG. 7 is a flowchart showing a method for stabilizing wavelength of LED radiation in backlight module of the LCD. In step 701, a target value of each wavelength is stored to the MCU. Thereafter, a judge range of each wavelength is determined according to statistic analyses as shown in step 702. Next, in step 703, light intensity and wavelength of an LED among the plurality of LEDs 101-106 are detected, followed by a judgement of "Is light intensity varied" shown in step 704. If answer is no, the step returns to step 703 to detect next LED. If answer is yes, in step 705, a first compensate value is determined according to the variation of light intensity. Then, in step 706, the process proceeds to judge if the detected wavelength is within the judge range of a specific wavelength. If answer is yes, in step 707, the LED is compensated with the first compensate value. If answer is no, a correction constant ω is determined according to the detected wavelength and its color match function, and the LED is compensated with a second compensate value that is equal to multiplication of the correction constant and first compensate value, as shown in step 708. Then, in step 709, the process proceeds to judge if all LEDs are completely detected. If answer is no, the steps 703-708 are repeated. If answer is yes, stabilizing wavelength of LED radiation for all LEDs in the LED backlight module is finished.

The Second Embodiment

Figure 8:
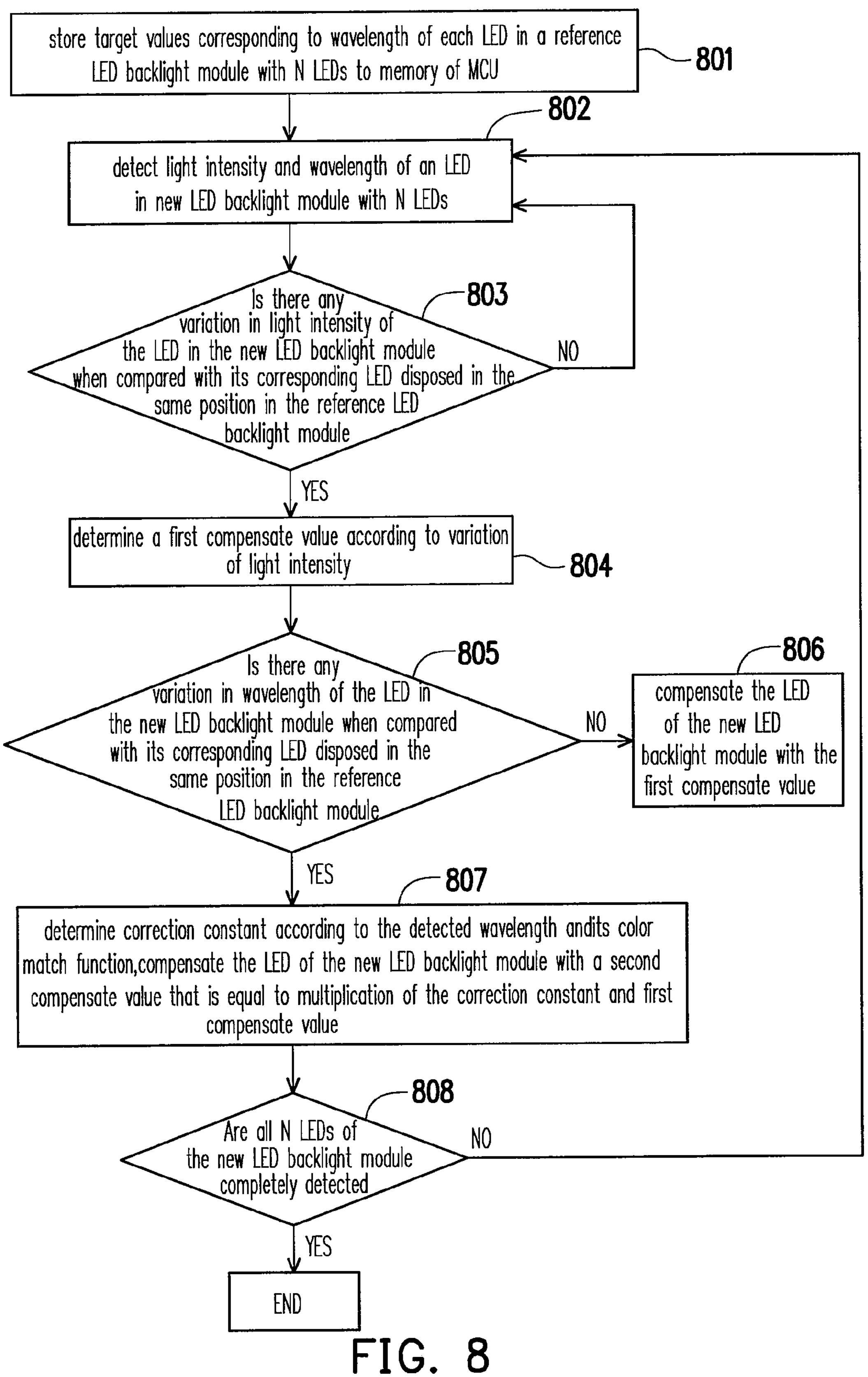
FIG. 8 is a flowchart showing a method for initializing wavelength of LED radiation in the LED backlight module of a liquid crystal display (LCD).

The invention can be applied to initialize an LED backlight module because same-color LEDs within a same production batch usually have uniform wavelengths. Moreover, initialization of LED backlight module cannot take only light intensity into account because the wavelength variation causes a shift of its corresponding chromaticity coordinates, i.e. instable color. FIG. 8 is flowcharts showing a method for initializing wavelength of LED radiation in the LED backlight module. First, in step 801, target values corresponding to wavelengths of each LED in a reference LED backlight module with N LEDs are stored the MCU, wherein N is an integer.

Then, light intensity and wavelength of an LED in new LED backlight module with N LEDs are detected, as shown in step 802. The process proceeds to judge if there is any variation in light intensity of an LED in the new LED backlight module when compared with its corresponding LED disposed in the same position in the reference LED backlight module, as shown in step 803. If answer is no, the process returns to step 802 to detect next LED in the new LED backlight module. If answer is yes, the process proceed to step 804 to determine a first compensate value according to the variation of light intensity. Next, the process proceeds to judge if there is any variation in wavelength of the LED in the new LED backlight module when compared with its corresponding LED disposed in the same position in the reference LED backlight module through comparing a calculated target value of the LED with its corresponding pre-stored target value, as shown in step 805. If answer is no, the process proceeds to step 806 to compensate the LED of the new LED backlight module with the first compensate value. If answer is yes, the process proceeds to step 807 to determine a correction constant according to the detected wavelength and its color match function, and compensate the LED of the new LED backlight module with a second compensate value that is equal to multiplication of the correction constant and the first compensate value. Next, in step 808, it is determined if all N LEDs of the new LED backlight module are completely detected. If answer is no, the steps 802-807 are repeated. If answer is yes, initialization of the LED backlight module is finished.

The invention has the following advantages over prior art:

1. Since wavelength of each of all LED radiation in the LED backlight module of the LCD can be detected and then compensated, the LED backlight module provides the LCD with more stabilized color.
2. To overcome color shift, a smaller bin is conventionally necessitated, which in turn increases the cost for batching LEDs. But, by implementing the invention, the color shift can be prevented while still employing 5 nm as a minima bin range. In other words, the invention is capable of suppressing the cost for batching LEDs, and eliminating color shift as a result of wavelength variation of each LED radiation at the same time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for stabilizing wavelength of light emitting diode (LED) radiation, comprising:

a first photo sensor circuit with a first photo sensor, outputting a first photo sensor electronic signal;

a second photo sensor circuit with a second photo sensor, outputting a second photo sensor electronic signal;

a microprocessor unit, coupled to the first photo sensor circuit and the second photo sensor circuit;

a driver circuit, coupled to the microprocessor unit; and a plurality of LEDs, coupled to the driver circuit;

wherein, the microprocessor unit executes an algorithm for determining wavelength of each LED radiation based on the first photo sensor electronic signal and the second photo sensor electronic signal, and outputs a compensation signal to compensate the LED having a wavelength shift.

2. The system of claim 1, wherein the algorithm for determining wavelength of each LED radiation based on the first photo sensor electronic signal and the second photo sensor electronic signal, comprises: dividing the first photo sensor electronic signal with the second photo sensor electronic signal at a first LED radiation and a second LED radiation, respectively, to eliminate an LED-light-intensity factor, wherein the first and second LED are the same one which is before and after the degrading of the plurality of LEDs, or different LEDs but have the same color and position; dividing the divided results obtained at the first LED radiation and obtained at the second LED radiation each other to obtain a target value that is only function of wavelength; and determining wavelength of a to-be-detected LED by using the target value.

3. The system of claim 2, the algorithm for determining wavelength of each LED radiation based on the first photo sensor electronic signal and the second photo sensor electronic signal, comprises: using the divided results obtained at the first LED radiation as a reference value and setting wavelength of the second LED radiation unknown; obtaining the target value for the second LED radiation by dividing the divided results obtained at the second LED radiation with the reference value; determining wavelength of the second LED radiation based on the target value for the second LED radiation.

4. The system of claim 3, wherein a judge range of each wavelength is determined based on statistical analyses of the target value for each wavelength, and the wavelength of the to-be-detected LED is determined based on the judge range for each wavelength.

5. The system of claim 1, wherein the plurality of LEDs are arranged in a group manner including a red LED, a green LED and a blue LED to provide a liquid crystal display with a variety of colors.

6. The system of claim 1, wherein the driver circuit has a current control mode and a voltage control mode, which control on or off of each LED.

7. The system of claim 1, wherein the first photo sensor and the second photo sensor are selected from a group consisting of a photodiode, a phototransistor, a color sensor and a photo sensitive resistor.

8. The system of claim 1, wherein each of the first photo sensor circuit and the second photo sensor circuit includes a feedback operation amplifier.

9. The system of claim 1, wherein the first photodiode electronic signal and the second photodiode electronic signal are current signals, or the first photodiode electronic signal and the second photodiode electronic signal are voltage signals.

10. The system of claim 1, wherein the compensation signal to compensate the LED having the wavelength shift is determined by the following steps: determining a first compensation signal for compensating light intensity variation; determining a correction constant according to the detected wavelength and its color match function; obtaining the compensation signal that is equal to a multiplication of the correction constant and the first compensate value.

11. A method for stabilizing color coordinate of LED backlight by detecting wavelength of light emitting diode (LED) radiation, comprising the following steps:

(a) storing a target value of each wavelength to a micro processor unit (MCU);

(b) determining a judge range of each wavelength according to statistic analyses;

(c) detecting light intensity and wavelength of an LED among a plurality of LEDs;

(d) judging if light intensity is varied, if answer is no, returning to step (c) to detect next LED;

(e) if answer is yes, determining a first compensate value according to variation of light intensity;

(f) judging if the detected wavelength is within its judge range, if answer is yes, compensating the LED with the first compensate value;

(g) if answer is no, compensating the LED with a second compensate value that is equal to a multiplication of a correction constant and the first compensate value;

(h) judging if all LEDs are completely detected, if answer is no, repeating the steps (c) to (g).

12. The method of claim 11, wherein in the step of compensating the LED with a second compensate value that is equal to multiplication of a correction constant and the first compensate value, the correction constant is determined based on the detected wavelength and its color match function.

13. The method of claim 11, wherein in the step (a), the target value of each wavelength is determined by the following steps:

dividing a first photo sensor electronic signal with a second photo sensor electronic signal at a first LED radiation and a second LED radiation, respectively, to eliminate an LED-light-intensity factor, wherein the first LED and second LED are the same one which is before and after the degrading of the plurality of LEDs, or different LEDs but have the same color and position; dividing the divided results obtained at the first LED radiation and obtained at the second LED radiation each other to obtain the target value that is only function of wavelength.

14. The method of claim 13, wherein the target value of each wavelength is determined by the following steps:

using the divided results obtained at the first LED radiation as a reference value and setting wavelength of the second LED radiation unknown; obtaining the target value for the second LED radiation by dividing the divided results obtained at the second radiation with the reference value.

15. The method of claim 14, wherein the first photo sensor electronic signal and the second photo sensor electronic signal are current signals, or the first photodiode electronic signal and the second photodiode electronic signal are voltage signals.

16. The method of claim 11, wherein the judge range of each wavelength is determined based on statistical analyses of the target value for the each wavelength, and a wavelength of the LED is determined based on the judge range of each wavelength.

17. The method of claim 11, wherein the plurality of LEDs are arranged in a group manner including a red LED, a green LED and a blue LED to provide a liquid crystal display with a variety of colors.

18. A method for initializing wavelength of light emitting diode (LED) radiation, comprising the following steps:

(a) storing a target value corresponding to wavelength of each LED in a reference LED backlight module having a plurality of LEDs to a microprocessor unit (MCU);

(b) detecting light intensity and wavelength of an LED in an LED backlight module having the same number of LEDs as the reference LED backlight module;

(c) judging if there is any variation in light intensity of the LED in the LED backlight module when compared with its corresponding LED disposed in the same position in the reference LED backlight module, if answer is no, returning to step (b) to detect next LED;

(d) if answer is yes, determining a first compensate value according to variation of light intensity;

(e) judging if there is any variation in wavelength of the LED in the LED backlight module when compared with its corresponding LED disposed in the same position in the reference LED backlight module, if answer is no, compensating the LED of the LED backlight module with the first compensate value;

(f) if answer is yes, compensating the LED with a second compensate value that is equal to a multiplication of a correction constant and the first compensate value;

(g) judging if all LEDs are completely detected, if answer is no, repeating the steps (b) to (f).

19. The method of claim 18, wherein in the step (f) of compensating the LED with a second compensate value that is equal to a multiplication of a correction constant and the first compensate value, the correction constant is determined based on the detected wavelength and its color match function.

20. The method of claim 18, wherein in the step (a), the target value of each wavelength is determined by the following steps:

dividing a first photo sensor electronic signal with a second photo sensor electronic signal at a first LED radiation and a second LED radiation, respectively, in order to eliminate an LED-light-intensity factor, wherein the first LED and second LED are the same one which is before and after the degrading of the plurality of LEDs, or different LEDs but have the same color and position; dividing the divided results obtained at the first LED radiation and obtained at the second LED radiation each other to obtain the target value that is only function of wavelength.

21. The method of claim 20, wherein the target value of each wavelength is determined by the following steps:

using the divided results obtained at the first LED radiation as a reference value and setting wavelength of the second LED radiation unknown; obtaining the target value for the second LED radiation by dividing the divided results obtained at second LED radiation with the reference value.

22. The method of claim 21, wherein the first photo sensor electronic signal and the second photo sensor electronic signal are current signals, or the first photodiode electronic signal and the second photodiode electronic signal are voltage signals.

23. The method of claim 18, wherein the plurality of LEDs are arranged in a group manner including a red LED, a green LED and a blue LED to provide a liquid crystal display with a variety of colors.

* * * * *